P. A. PRICE.
WEEDING MACHINE.
APPLICATION FILED FEB. 21, 1917.

1,291,129.

Patented Jan. 14, 1919.
2 SHEETS—SHEET 1.

Inventor
P. A. Price

Witness

P. A. PRICE.
WEEDING MACHINE.
APPLICATION FILED FEB. 21, 1917.
1,291,129.
Patented Jan. 14, 1919.
2 SHEETS—SHEET 2.
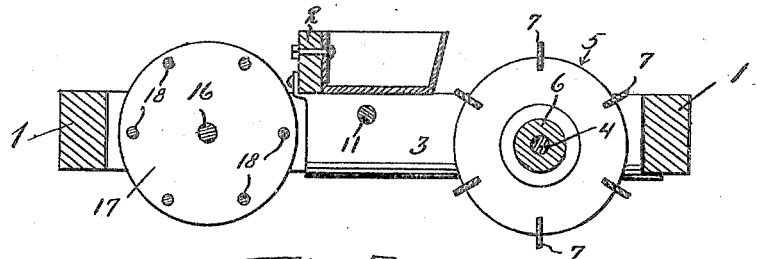
Fig. 3.
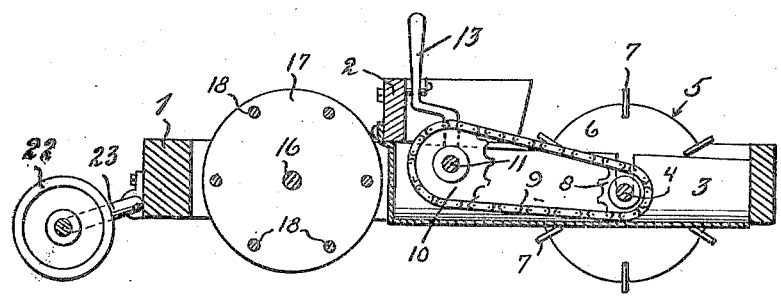
Fig. 4.
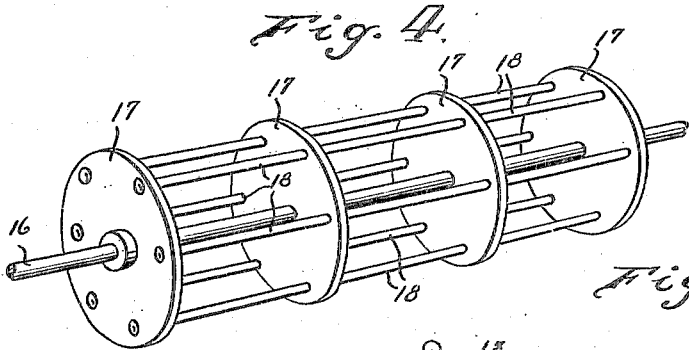
Fig. 5.
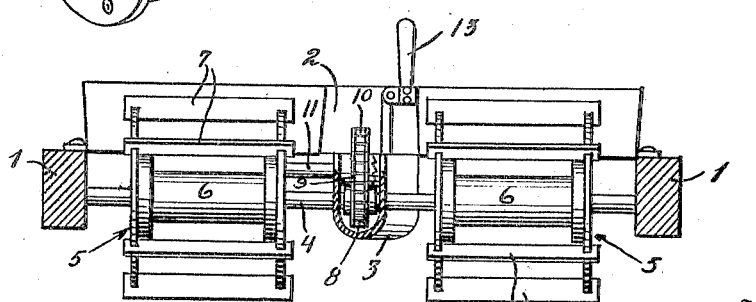
Fig. 6.
Witness 
Inventor
P. A. Price
By 
Attorneys

UNITED STATES PATENT OFFICE.

PORT A. PRICE, OF BENGE, WASHINGTON.

WEEDING-MACHINE.

1,291,129.    Specification of Letters Patent.    Patented Jan. 14, 1919.

Application filed February 21, 1917. Serial No. 150,061.

*To all whom it may concern:*

Be it known that I, PORT A. PRICE, a citizen of the United States, residing at Benge, in the county of Adams, State of Washington, have invented certain new and useful Improvements in Weeding-Machines; and I do hereby declare the following to be a full, clear, and exact description of the invention, such as will enable others skilled in the art to which it appertains to make and use the same.

This invention relates to weeding machines.

The object of this invention is to provide an improved form of weeder in which the ground is traversed by agitating elements which combine a rotary and dragging action, and which furthermore includes a stalk chopping mechanism.

To this end, my invention consists in the provision of a frame within which is mounted traction devices which also act as stalk chopping elements, and a rotary drag device which simultaneously rolls and drags or slides upon the ground so that the earth is evenly agitated to uproot and cover or throw out the weed stalks. The amount of the drag is regulated by suitable gearing from the traction elements, and means is furthermore provided for adjusting the depth to which the drag element is to be entered into the ground.

With the above objects in view and such others as may hereinafter appear, my invention will now be fully set forth and described, reference being had to the accompanying drawings.

In the drawings:—

Fig. 3 is a longitudinal section, on line 3—3 of Fig. 1,

Fig. 4 is a second longitudinal section taken centrally through the machine,

Fig. 5 is a perspective view of the drag device, and

Fig. 6 is a transverse section in front of the traction or chopping wheels.

Figure 1:
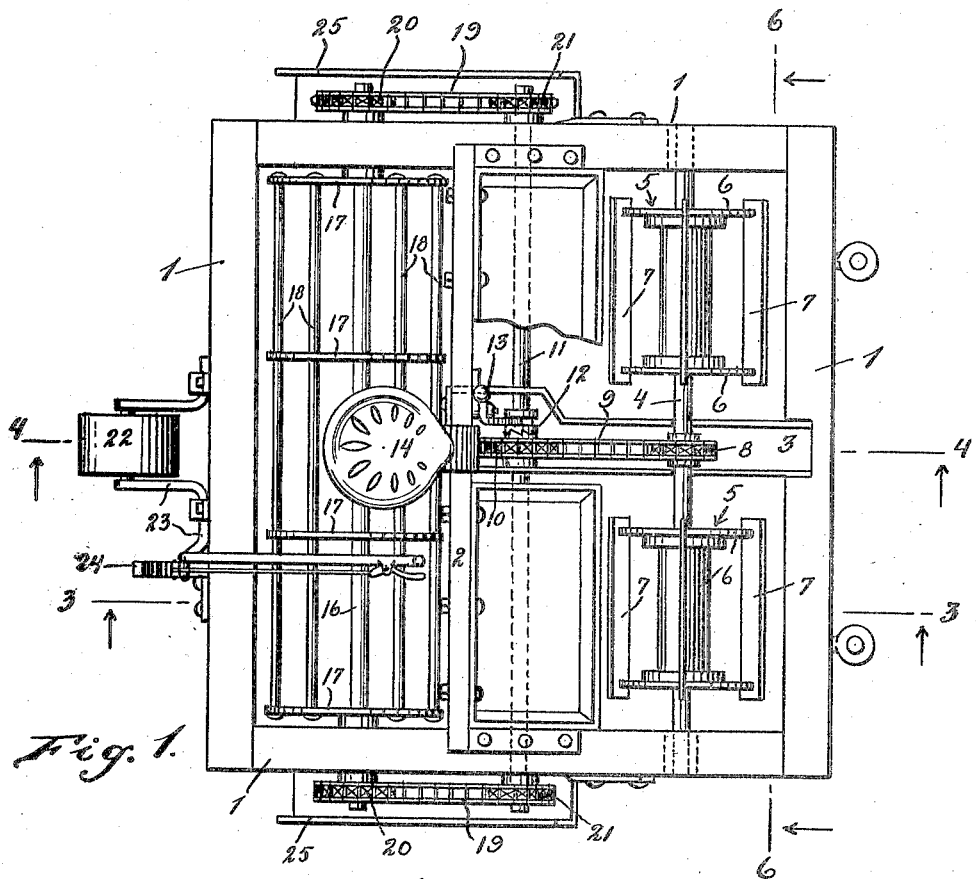
Figure 1 is a plan view of the machine.
Figure 2:
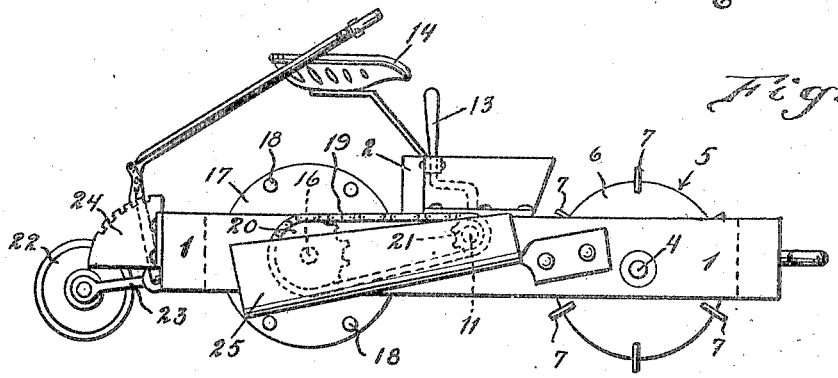
Fig. 2 is a side elevation.

Referring more particularly to the drawings, 1 represents the frame which is rectangular in form and preferably approximates a square, the longitudinal beams of the frame being transversely connected by an intermediate beam 2 mounted upon the frame. Connecting the front beam and said transverse beam 2 is a trough-like beam 3 which also provides a guard, as will hereinafter appear. The forward portion of the frame 1 is traversed by a shaft 4 having its bearings in the side beams of the frame and carrying the drums 5 consisting of suitable hub structures carrying the end plates 6 whose peripheral edges are radially recessed and therein fitted with the blades 7. These blades 7, as the machine is drawn across a field act as traction devices by cutting into the sod or soil, and also act as choppers for weed stalks and the like. One of the drums 5 is mounted on each side of the brace or guard 3, and is rigidly fixed upon the shaft 4. Within the guard or trough-like beam 3, the shaft 4 is provided with a sprocket 8 over which passes a sprocket chain 9, said chain 9 also passing over a second sprocket 10 located within the trough and rigidly fixed upon a transmission shaft 11 also having its bearings in the frame 1 and projecting beyond the sides thereof. A clutch 12 mounted on the shaft 10 is provided for connecting and disconnecting the gear 8 from the shaft, a control lever 13 projecting upwardly into proper relationship to the driver's seat 14 which is mounted upon the transverse beam 2. Behind the beam 2 the frame is traversed by a second shaft 16 also having its bearings in the sides of the frame and having its ends projected therebeyond, and said shaft rigidly carries thereon the rotary drag structure. The drag structure consists of a plurality of plates or disks 17 having their centers mounted upon the shaft 16 and being connected adjacent their peripheries by a plurality of rods 18 passed through the disks 17 and suitably fastened. The disks 17 are of suitable number and spacing and likewise the rods 18 are properly spaced and numbered to suit the size of the machine or the ground in the locality wherein the device is to be used. The drag device is driven by means of chains 19 which pass over the sprockets 20 on the ends of the shaft 16 and sprockets 21 on the ends of the shaft 11, and the gearing between the drums 5 and the shaft 16 is such that the latter will be driven at about one-third, preferably, of the speed of the drums 5, the gear 10 being comparatively large, and the gears 21 and 20 being also properly proportioned to bring about the desired ratio.

The rear end of the frame 1 is supported by a broad surfaced wheel 22 which is mounted in an adjustable bracket 23 carried by the rear end of the frame so that the elevation of the frame 1 above the ground may be varied in order to determine the depth to which the drag device will enter into the ground and work the latter, a suitable lever and segment mechanism 24 being provided for control from the driver's seat in order to effect this adjustment without the necessity of leaving the latter.

The gears 20 and 21, with their connecting chains are suitably protected by guard channels or troughs 25 secured to the sides of the frame 1, and supported by the side beams of the frame and the transverse beam 2 is a pair of boxes or receptacles within which ballast may be placed in order to weight the machine in regulated quantity to suit the ground over which the machine is being operated.

From the foregoing it is apparent that I have provided a very simple and practical machine for simultaneously chopping, rolling and dragging the ground, the machine having all of the ground working properties, of the usual drag device, while having such tractive powers that the usual amount of power required to operate the drag is very materially reduced. Furthermore, the action of the drag or rotary sliding elements is such that the ground is worked with the result of covering or throwing out weeds which the traction drums or chopping devices 5 have preliminarily broken and loosened.

What I claim as my invention is:—

1. A weeding machine including a frame, combined traction and stalk chopping drums mounted at the forward portion of the frame and affording the sole support of said forward portion of the frame, a drag device rotatably mounted at the rear portion of the frame and means for effecting driving rotation of the drag device by rotation of the traction and stalk chopping drums to rotate the former at a slower speed from the latter.

2. A weeding machine including a frame, combined traction and stalk chopping drums at the forward portion of the frame and affording the sole support for said forward portion of the frame, vertically adjustable wheeled support means at the rear portion of the frame, a drag device journaled between the first named drums and the wheeled supporting means and means for effecting the driving rotation of the drag device by rotation of the traction and stalk chopping drums to rotate the former at a slower speed from the latter.

In testimony whereof, I affix my signature, in the presence of two witnesses.

PORT A. PRICE.

Witnesses:

Louis Eilert,
J. H. Detling.

Copies of this patent may be obtained for five cents each, by addressing the "Commissioner of Patents, Washington, D. C."